United States Patent [19]

Frihart

[11] Patent Number: 5,155,177
[45] Date of Patent: Oct. 13, 1992

[54] THREE COMPONENT AMINOAMIDE ACRYLATE RESIN COMPOSITIONS

[75] Inventor: Charles R. Frihart, Lawrenceville, N.J.

[73] Assignee: Union Camp Corporation, Wayne, N.J.

[21] Appl. No.: 670,673

[22] Filed: Mar. 18, 1991

[51] Int. Cl.$^5$ .................. C08F 283/04; C08G 69/44; C08G 69/48; C08L 77/12
[52] U.S. Cl. .................. 525/420.5; 525/426; 525/435; 522/164
[58] Field of Search .................. 525/420.5, 426, 435; 522/164

[56] References Cited

U.S. PATENT DOCUMENTS

| | | | |
|---|---|---|---|
| 2,959,565 | 11/1960 | Stanton et al. | 525/426 |
| 3,127,365 | 3/1964 | Floyd | 525/420.5 |
| 3,890,150 | 6/1975 | Hasegawa et al. | 522/164 |
| 4,218,294 | 8/1980 | Brack | 522/164 |
| 4,329,419 | 5/1982 | Goff et al. | 522/164 |
| 4,710,539 | 12/1987 | Siadat et al. | 525/426 |
| 4,870,139 | 9/1989 | Kveglis | 525/426 |
| 4,975,498 | 12/1990 | Frihart | 525/426 |
| 4,987,160 | 1/1991 | Frihart et al. | 525/420.5 |

FOREIGN PATENT DOCUMENTS

| | | |
|---|---|---|
| 618508 | 4/1961 | Canada . |
| 0373878 | 6/1990 | European Pat. Off. . |
| 56-122833 | 9/1981 | Japan . |

*Primary Examiner*—Morton Foelak
*Assistant Examiner*—Rabon Sergent
*Attorney, Agent, or Firm*—William K. Wissing

[57] ABSTRACT

This invention provides acrylate-modified polyamide resins comprising the Michael addition product of a mixture of a thermoplastic polyamide and reactive diluent with a polyol ester having a plurality of acrylate ester groups, wherein the mole ratio of the initial acrylate groups of the polyol ester to the initial amino groups of the polyamide ranges from about 0.5 to about 8.0, and wherein the reactive diluent's from about 1% to about 25% by weight polyamide. The diluent comprises mono- and di-substituted amines of 10 to 44 carbon atoms.

22 Claims, No Drawings

THREE COMPONENT AMINOAMIDE ACRYLATE RESIN COMPOSITIONS

BACKGROUND OF THE INVENTION

1. Field of the Invention

The invention relates to new polyamide polyacrylate compositions useful as hot melt adhesives. In particular the invention relates to aminoamide polymer compositions including a reactive diluent which serves to reduce the polyamide viscosity for improved mixing and reaction with the polyacrylate to make a curable thermoplastic resin.

2. Description of Related Art

Polyamides are a well known class of thermoplastic polymer. Most polyamides cannot be cured to thermoset polymers. Certain aminoamide polymers are useful hot melt adhesives, but if they are used in a non-crosslinked thermoplastic mode, they are subject to cold flow, remelting, solvent attack and other modes of deterioration. It is known to crosslink aminoamides, in fact they are often used themselves as crosslinking agents for epoxy resins, but such crosslinking generally requires a "two package" system, the aminoamide resin being one package, and a co-reactive resin, typically an epoxy resin, being the other package. Such "two package" systems are commercially used, but have the shortcomings of requiring two containers, measuring and mixing at the point of use, limited working time after the mixing, and they generally require substantial time and/or heating to effect partial cure, to give good green strength. Even further time and/or heating is required for complete cure.

It is known to blend acrylate polymers into polyamides for improved properties such as for hot melt adhesive uses, as is taught in U.S. Pat. Nos. 4,132,690 (E. Ernstman et al.) and 4,374,231 (Doucet); for molding resin uses as in U.S. Pat. No. 4,247,665 (Daniels et al.); and for pressure-sensitive adhesive uses, as in U.S. Pat. No. 4,696,965 (Rasmussen). However, the acrylate polymers of these disclosures are already polymerized and have no free acrylate groups. Thus, such blends are in most cases not chemically linked by covalent bonds and are not capable of being post cured to render them thermoset (infusible). Grafts and copolymers of polyamides and acrylates, suitable for adhesive uses, are taught in U.S. Pat. Nos. 4,247,665 (Daniels et al.) and 4,378,448 (Part et al.) but these also had the acrylate group used up in the grafting or copolymerization and so free acrylate groups were not available for crosslinking the chains.

Curable adhesives have also been made using acrylate groups as the curing agent as in U.S. Pat. No. 4,153,776 and 4,430,479 (Merton, et al.) but these did not utilize aminoamides.

U.S. Pat. No. 4,329,419 (Goff, et al.) discloses a radiation polymerizable composition of a polyamide ester containing photopolymerizable groups and a solvent for the resin. The improvement was found in the use of a radiation sensitive polymerizable polyfunctional acrylate compound and an aromatic biimidazole photopolymerization initiator. This invention is limited to aromatic polyamides with a high level of mid-chain polymerizable groups and requires a solvent. Not being a hot-melt system, this technology is limited by solvent emission problems. In addition the high aromatic content makes a rigid product.

U.S. Pat. No. 3,127,365 (Floyd) discloses an amino polyamide resin in which an excess of a polyamine is reacted with polymer fatty acids to form a polyamide having unreacted amino groups. The amino polyamides are in turn modified by reaction with acrylic monomers. This invention is a two-component system because upon mixing the acrylate and the high amine number polyamide, the curing reaction takes place. In addition a highly crosslinked product is formed due to the high amine value of the polyamide.

U.S. Pat. No. 4,975,498 (Frihart) discloses acrylate-modified aminoamide resins comprising the Michael addition product of an aminoamide thermoplastic polymer with sufficient polyol ester having a multiplicity of acrylate ester groups so that the modified polyamide contains unreacted acrylate groups. This thermoplastic contains a thermally activatable catalyst to cause curing upon heating.

U.S. Pat. No. 4,987,160 (Frihart) discloses acrylate-modified aminoamide resins which comprise the Michael addition product of an aminoamide thermoplastic polymer with sufficient polyol ester having a multiplicity of acrylate ester groups so that the modified polyamide contains unreacted acrylate groups. This thermoplastic can be cured by radiation, such as electron beam or ultraviolet if a photoinitiation catalyst is added.

SUMMARY OF THE INVENTION

The current invention provides for the addition of a reactive diluent to the polyamide which serves to reduce the viscosity of the polyamide for improved mixing with the polyol polyacrylate patents. The result is an acrylate-modified polyamide of much lower viscosity, and therefore, of greater utility as a hot-melt adhesive. However, the ultimate strength of the product is maintained or improved in contrast to the deterioration in properties generally observed when an unreactive diluent or a lower molecular weight polyamide is used to reduce the polyamide viscosity.

This invention provides acrylate-modified polyamide resins and acrylate-modified diluent comprising the Michael addition product of a thermoplastic polyamide and a diluent with a polyol ester having a plurality of acrylate ester groups, wherein the mole ratio of the initial acrylate groups of the polyol ester to the initial amino groups of the polyamide and diluent ranges from about 0.5 to about 8.0, further comprising from about 1% to about 25% by weight polyamide of a reactive diluent. The diluent comprises mono- and di-substituted amines and/or diamines of 10 to 44 carbon atoms.

DETAILED DESCRIPTION OF THE INVENTION

The compositions of the invention, most broadly, can be made using any thermoplastic polyamide and reactive diluent polymer containing groups that can add across acrylate groups. In a preferred group of compositions within the invention, the polyamide should have an amine plus acid number greater than about 1 and less than about 50 and also have an excess of amine to acid groups. More preferably, the polyamide should have an amine plus acid number greater than about 2 and less than about 30 and most preferably, less than about 20, (the amine functionality is expressed in a conventional manner in terms of mg. of equivalent KOH/g of sample.) Preferably, the number of amine groups of the polyamide resin should be 51 to 99% of the total number of acid and amine groups. With very low functionality, the groups are too dispersed to cure sufficiently. With higher functionality, there is risk of premature gelation or at least excessive viscosity. For better initial adhesive strength quality, or green strength as it is commonly known by one skilled in the art, the polyamides should also have a softening point above 50° C., preferably between about 75° C. to about 200° C.

In the preferred group of compositions within the invention, the polyamides are made from polymerized fatty acids, linear dicarboxylic acids and linear, branched or cyclic polyamines. A linear monocarboxylic acid may be added in addition to changes in the ratio of amines and acids to control the molecular weight.

The polyamide compositions of the invention can be made using 30-100 percent equivalent (i.e., 30-100% of the total acid groups present in the mixture before polymerization are derived from the dimer component) of any polymerized, unsaturated fatty acid or the reaction product of an acrylic acid with unsaturated fatty acids. Preferably, the polyamide compositions are made using 50-90 equivalent percent of the fatty acid. Most preferable is a polymerized unsaturated fatty acid having a dimeric fatty acid content greater than 65 percent by weight. One particularly suitable material is the material known commercially as dimer acid. In general, non-linear dicarboxylic acids, especially non-linear dicarboxylic acids having 21 to 44 carbon atoms are suitable.

The term "dimer acid" refers to polymeric or oligomeric fatty acids typically made by addition polymerization of unsaturated tall oil fatty acids. These polymeric fatty acids typically have the composition 0-10% $C_{18}$ monobasic acids, 60-95% $C_{36}$ dibasic acids, and 1-35% $C_{54}$ tribasic and higher polymeric acids. The relative ratios of monomer, dimer, trimer and higher polymer in unfractionated "dimer acid" are dependent on the nature of the starting material and the conditions of polymerization and distillation. Methods for the polymerization of unsaturated fatty acids are described, for example, in U.S. Pat. No. 3,157,681. The dimer content is also controlled by the fractionation conditions used to reduce the monomer, trimer and higher polymer components.

Linear dicarboxylic acids may be added in amounts up to about 70 equivalent percent, preferably 10-50 equivalent percent, and have from 6 to about 22 carbon atoms. Preferred linear dicarboxylic acids include oxalic, malonic, succinic and suberic acids. More preferred are adipic, azelaic, sebacic and dodecanedioic acids.

Monocarboxylic acids may be added in amounts up to about 10 equivalent percent to control molecular weight. Preferred monocarboxylic acids are linear and have 2 to 22 carbon atoms. Most preferred are stearic, tall oil fatty and oleic acids.

Linear, branched, or cyclic polyamines are added in amounts of from about 100 equivalent percent up to about 120 equivalent percent, based upon total acid groups added to the polymerization, more preferably from about 100 equivalent percent up to about 115 equivalent percent, and have from 2 to 60 carbon atoms. The polyamines are mainly diamines. Preferred aliphatic polyamines include ethylenediamine, diaminopropane, diaminobutane, diaminopentane, hexamethylenediamine, methylpentamethylenediamine, methylnonanediamine, piperazine, dipiperazine, aminoethylpiperazine, bis(aminoethyl)piperazine, bis(aminomethyl)cyclohexane, and dimer diamine (diamine made from dimer acid). Xylenediamine and bis(aminoethyl)benzene are also useful. Most preferred are ethylenediamine, hexamethylenediamine, piperazine, methylpentamethylenediamine, dimer diamine, and polyetherdiamines.

Polyetherdiamines provide products with better flow properties. Polyetherdiamines are added in amounts of from 2 to 60 equivalent percent, and more preferably from 5 to 40 equivalent percent. The most preferred polyetherdiamines include diamines made from propylene oxide polymers having molecular weights of from 100 to about 8000, diamines made from ethylene oxide polymers having molecular weights of from 100 to about 8000, and diamines made from ethylene oxide-propylene oxide polymers having molecular weights of from 100 to about 8000. Other suitable polyetherdiamines include triamines made from propylene oxide polymers or ethylene oxide polymers and having molecular weights of from 100 to about 8000. Typical commercial products are Jeffamine TM D-230, D-400, D-4000, ED-600, ED-900, ED-2001, ED-4000, ED-6000, T-403, and ER-148 (Texaco Chemical Company, Bellaire, Tex.).

Suitable polyamides are commercially available, for example, as UNI-REZ TM 2622, 2636, 2643, 2646, 2648, 2654, and 2696 (Union Camp Corporation, Wayne, N.J.).

The reactive diluent comprises mono- and disubstituted amines having 10 to 44 carbon atoms. The diluent is preferably of low volatility and may include other functional groups. Preferred reactive diluents are stearylamine, tallowamine, ditallowamine, and dihydrogenated tallowamine. Diamines, such as tallowaminopropylamine, and dimerdiamine are also useful as reactive diluents. Generally low volatility amines are preferred over more volatile amines. The ratio of polyamide to reactive diluent is from about 100 to 1 to 100 to 25, preferably from about 100 to 3 to 100 to 20.

The polyol ester having a multiplicity of acrylate ester groups can be an ester of acrylic or methacrylic acid, or mixture thereof, having from two to about eight such acrylic or methacrylic acid groups. As used herein, the generic term "acrylate" includes methacrylate, and "acrylic acid" includes methacrylic acid. The polyol may therefore have a minimum of two alcoholic hydroxyl groups before esterification. It is not necessary that all of the alcoholic groups be esterified with the acrylic acid, as long as at least two are so esterified on the average.

Thus, suitable polyol esters of acrylic acids include the following: ethylene glycol diacrylate or dimethacrylate, butanediol diacrylate or dimethacrylate, diethylene glycol diacrylate or dimethacrylate, glycerol trimethacrylate, sorbitol triacrylate, trimethylolethane triacrylate, trimethylolpropane triacrylate, ethoxylated trimethylolpropane triacylate, trimethylolpropane trimethacrylate pentaerythritol tri- or tetraacrylate or tri- or tetramethacrylate, and multifunctional acrylates or methacrylates of dipentaerythritol or tripentaerythritol, sucrose pentamethacrylate, bisphenol-A bis(hydroxypropyl) ether diacrylate, and the like, with the materials trimethylolethane triacrylate, trimethylolpropane triacrylate, ethoxylated trimethylolpropane triacrylate, trimethylolpropane trimethylacrylate pentaerythritol tri- or tetraacrylate or tri- or tetramethacrylate being most preferred, using 0.5 to 8.0 acrylate groups per amino group.

By Michael addition is meant the addition reaction of an amino group across an activated double bond, typically of an ester, to form a new more highly alkylated amine, thus:

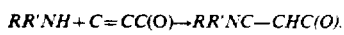

Such reactions generally proceed spontaneously at room temperature and can be accelerated by heating. R and R' in the above formula can be hydrocarbyl or hydrogen. In the present context, at least one of R and R' will be hydrocarbyl, being a part of the aminoamide. R and R' may also be aminodiethylene as, for example, when piperazine is used.

In order to carry out the Michael addition reaction, the three reactants (polyamide, diluent and acrylate) have to be brought into contact. While this can be accomplished by use of a solvent such as methanol or ethylene dichloride, it is preferred to melt the polyamide and mix it with the acrylate ester, which is usually a liquid or an easily melted solid. Since at least one of the reactants is a solid, it is preferred that the reaction mixture be heated at least up to the softening point of the lowest melting reactant. The reaction temperature will generally not exceed 190° C., since at higher temperatures, some cracking or premature gelation of the acrylates and/or reaction product can occur. The addition can be carried out in any suitable vessel having resin mixing capabilities, thus a kettle with a stirrer may be used, a Banbury mixer, an extruder, or even a static mixer.

Optionally, a photoinitiator is included if the product is intended to be cured by light. The photoinitiator can be omitted for a product intended to be cured by electron beam, gamma radiation, or x-ray. The presence of the photoinitiator of course allows the product to be cured by any of these means.

Suitable optional photoinitiators are benzoin ethers, dialkoxyacetophenones, alpha-hydroxycyclohexyl aryl ketones, alpha-ketophenylacetate esters, benzyldialkyl-ketals, chloro- or alkylthioxanthones, alpha-amino- or alpha-hydroxylalkyl aryl ketones, and the like. An example is Irgacure 907, 2-methyl-1-[4-(methylthio) phenyl]-2-morpholino-propanone-1, made by Ciba-Geigy. Generally, amine synergists will not be necessary when a photoinitiator normally used with an amine synergist is employed, such as benzophenone or a thioxanthone, since the resin itself provides amino groups.

The photoinitiator can be mixed in at the time of the Michael addition reaction, either before, during or after the reaction.

Optionally included is an effective amount of a stabilizer, such as a phenolic inhibitor of free radical polymerization, exemplified by methoxyphenol, hydroquinone, benzoquinone, phenothiazine, or the like, at levels of from about 5 ppm to 5,000 ppm, to lengthen the shelf life of the product. In many cases, such inhibitors will be found already present in the polyol acrylates used as reactants.

The composition further optionally includes a source of free radicals, also known as a thermally activated initiator. This must be a catalyst which is stable under the storage conditions of the product. One category of suitable catalysts are those with a half-life of 10 hours or greater at about 50° C., for example t-butyl peroxypivalate, lauroyl peroxide, benzoyl peroxide, t-butyl peroctoate, t-butyl peroxy isopropyl carbonate, t-butyl perbenzoate, di-t-butyl peroxide and t-butyl hydroperoxide, azobisisobutyronitrile, cumyl hydroperoxide, dicumyl peroxide, t-butyl cumyl peroxide, bis(t-butylperoxy)diisopropylbenzene, and ethyl-O-benzoyllaurohydroximate. The preferred initiator, because of good lifetime in storage and effectiveness in curing is dicumyl peroxide. These initiators can be added before, during, or preferably after, the Michael addition reaction. The preference for addition after the reaction is to avoid premature activation when the Michael reaction mixture is warmed up deliberately or by the exotherm of the reaction. Initiator levels of from about 0.01 to about 5%, more preferably about 0.02 to about 2%, are generally found to give an adequate balance between shelf life and cure rate at the desired cure temperatures. With the initiators in the lower temperature range of activity, the product containing them should either be used quickly or stored in refrigerated conditions. With initiators in the higher temperature range, typically with a half-life of 10 hours at about 70° C., the product will have a useful shelf life at ambient temperature.

With heat activatable curing initiators, the curing temperature will generally be between 70° C. and 250° C. and the times from on the order of magnitude of a minute at the higher temperature to the order of magnitude of a week at the lower temperature. It is known to one skilled in the art of free radical polymer chemistry that the choice of initiator strongly influences the necessary cure temperature and time. If the cure is allowed to take 10 hours, then a reasonable temperature range is around the temperature at which the initiator has a 10 hour half-life. Shorter cure times require higher temperatures.

It will be evident to one skilled in the art of adhesive formulation that other additives such as fillers, reinforcing agents, coupling agents, colorants, odorants, other comonomers, resins, tackifiers, plasticizers, lubricants, stabilizers, antistats, and the like can optionally be added. It is a further option to add additional amounts of a polyol acrylate to increase the crosslink density and give a more firmly cured product, or conversely to add a monoacrylate or a thermoplastic resin to get a softer more pliable product.

EXAMPLES

EXAMPLE 1

Control; Uncured Polyamide A

An amine-terminated polyamide was produced by adding 69.9 equivalent percent of a polymerized fatty acid (Unidyme 14; Union Camp Corporation, Wayne, N.J.), 30 equivalent percent of sebacic acid, 49.1 equivalent percent of ethylenediamine, 57.7 equivalent percent of anhydrous piperazine, 0.5 weight percent of Irganox 1010 (based on weight of the polyamide) and about 6 drops of phosphoric acid to a resin kettle. A nitrogen inlet, baret trap, condenser and thermocouple were attached to the resin kettle head. The mixture was stirred and heated gradually to approximately 250° C. for about three hours. Once the ingredients had all been dissolved and thoroughly blended, the baret trap and condenser were removed and vacuum was applied. The system was kept at a constant temperature of about 250° C. under vacuum for another three hours. The vacuum pressure was then released and the polyamide was poured onto release paper to cool.

The resulting polyamide had an acid number of 2.2 and an amine number of 5.8. The viscosity was 10,160 cps at 190° C., as measured by a Brookfield RVTD viscometer and a softening point of from about 141° C. to 147° C, as determined by standard ASTM ring and ball softening point methods.

Upon solidification, 27g of the mixture were placed in a Carver laboratory press apparatus. The solidified mixture was pressed at a temperature and pressure sufficient to form a sheet of uniform thickness. The pressed sheet was then stamped using a mallet and die to obtain samples for tensile tests.

Tensile samples were tested at 23° C., after 24 hour storage at 23° C. and 50% humidity, and at 60° C., after 24 hour storage in 60° C. water. The tensile tests were conducted according to standard ASTM method D-638.

The results of the tensile tests and viscosity measurements for the uncured polyamide resin are found in Table 1.

EXAMPLE 2

Acrylate Modification of Polyamide A

Polyamide A of Example 1 (200g) was combined with Irgacure 907 (1g) and hydraquinone (0.4g). These ingredients were charged into a small resin kettle equipped with a nitrogen inlet, stirrer, and thermocouple. The solution was stirred upon heating to 160° C. A vacuum was applied for three hours. After the vacuum was released, trimethylolpropane triacrylate (6.0g) was added. The mixture was stirred for a half hour and then discharged. The polyamide was poured onto release paper to cool.

Samples for tensile testing were prepared according to the method described in Example 1. These samples were then placed under a Dymax Light-Welder PC-2 with a UV-B filter at a distance of ten inches from the Light-Welder and allowed to cure for six minutes. The sample was then turned over and allowed another six minutes cure time for the other side. The samples were then tested according to ASTM D-638 as described in Example 1.

The results of the tensile tests performed on the cured samples and viscosity measurements for the uncured polyamide resin are found in Table 1.

EXAMPLE 3

Acrylate Modification of Polyamide A With Tallowamine

Polyamide A of Example 1 (200g) was combined with Irgacure 907 (1g) and hydraquinone (0.4g). These ingredients were charged into a small resin kettle equipped with a nitrogen inlet, stirrer, and thermocouple. The solution was stirred upon heating to 160° C. A vacuum was applied for three hours. After the vacuum was released, tallowamine (14g of Kenamine P970) was added and the mixture was stirred for one hour. Trimethylolpropane triacrylate (19.9g) was then added. The mixture was stirred for a half hour and then discharged. The polyamide was poured onto release paper to cool.

Samples for tensile testing were prepared according to the method described in Example 1. These samples were then placed under a Dymax Light-Welder PC-2 with a UV-B filter at a distance of ten inches from the Light-Welder and allowed to cure for six minutes. The sample was then turned over and allowed another six minutes cure time for the other side. The samples were then tested according to ASTM D-638 as described in Example 1.

The results of the tensile tests performed on the cured samples and viscosity measurements for the uncured polyamide resin are found in Table 1.

EXAMPLE 4

Acrylate Modification of Polyamide A With Di(hydrogenated)tallowamine

Polyamide A of Example 1 (200g) was combined with Irgacure 907 (1 g) and hydraquinone (0.4g). These ingredients were charged into a small resin kettle equipped with a nitrogen inlet, stirrer, and thermocouple. The solution was stirred upon heating to 160° C. A vacuum was applied for three hours. After the vacuum was released, di(hydrogenated)tallowamine (20g of Adogen 240) was added and the mixture was stirred for one hour. Trimethylolpropane triacrylate (16.2g) was then added. The mixture was stirred for a half hour and then discharged. The polyamide was poured onto release paper to cool.

Samples for tensile testing were prepared according to the method described in Example 1. These samples were then placed under a Dymax Light-Welder PC-2 with a UV-B filter at a distance of ten inches from the Light-Welder and allowed to cure for six minutes. The sample was then turned over and allowed another six minutes cure time for the other side. The samples were then tested according to ASTM D-638 as described in Example 1.

The results of the tensile tests performed on the cured samples and viscosity measurements for the uncured polyamide resin are found in Table 1.

EXAMPLE 5

Control; Uncured Polyamide B

Example 5 is control sample of an uncured, amine-terminated polyamide, UNI-REZ ™ 2636 (the Union Camp Corporation, Wayne, N.J.). This polyamide has an acid number of 0.6 and an amine number of 7.6. The viscosity of the polyamide at 190° C., as measured by a Brookfield RVTD viscometer, was 6,550 cps, while the softening point, as determined by standard ASTM ring and ball softening point methods, was 135° C.

Upon solidification, 27g of the mixture were placed in a Carver laboratory press apparatus. The solidified mixture was pressed at a temperature and pressure sufficient to form a sheet of uniform thickness. The pressed sheet was then stamped using a mallet and die to obtain samples for tensile tests.

Tensile samples were tested at 23° C., after 24 hour storage at 23° C. and 50% humidity, and at 60° C., after 24 hour storage in 60° C. water. The tensile tests were conducted according to standard ASTM method D-638.

The results of the tensile tests and Viscosity measurements for the uncured polyamide resin are found in Table 1.

EXAMPLE 6

Acrylate Modification of Polyamide B

Polyamide B of Example 5 (200g) was combined with Irgacure 907 (1g) and hydraquinone (0.4g). These ingredients were charged into a small resin kettle equipped with a nitrogen inlet, stirrer, and thermocouple. The solution was stirred upon heating to 160° C. A vacuum was applied for three hours. After the vacuum was released, trimethylolpropane triacrylate (6.2g) was added. The mixture was stirred for a half hour and then discharged. The polyamide was poured onto release paper to cool.

Samples for tensile testing were prepared according to the method described in Example 1. These samples were then placed under a Dymax Light-Welder PC-2 with a UV-B filter at a distance of ten inches from the Light-Welder and allowed to cure for six minutes. The sample was then turned over and allowed another six minutes cure time for the other side. The samples were then tested according to ASTM D-638 as described in Example 1.

The results of the tensile tests performed on the cured samples and viscosity measurements for the uncured polyamide resin are found in Table 1.

EXAMPLE 7

Mixing of Polyamide B with Tallowamine

Polyamide B of Example 5 (200g) was charged into a small resin kettle equipped with a nitrogen inlet, stirrer, and thermocouple. The solution was stirred upon heating to 160° C. A vacuum was applied for three hours. After the vacuum was released, tallowamine (20g of Adogen 240) was added and the mixture was stirred for one hour, and then discharged. The polyamide was poured onto release paper to cool.

Samples for tensile testing were prepared according to the method described in Example 1. These samples were then placed under a Dymax Light-Welder PC-2 with a UV-B filter at a distance of ten inches from the Light-Welder and allowed to cure for six minutes. The sample was then turned over and allowed another six minutes cure time for the other side. The samples were then tested according to ASTM D-638 as described in Example 1.

The results of the tensile tests performed on the cured samples and viscosity measurements for the uncured polyamide resin are found in Table 1.

EXAMPLE 8

Acrylate Modification of Polyamide B With Tallowamine

Polyamide B of Example 5 (200g) was combined with Irgacure 907 (1g) and hydraquinone (0.4g). These ingredients were charged into a small resin kettle equipped with a nitrogen inlet, stirrer, and thermocouple. The solution was stirred upon heating to 160° C. A vacuum was applied for three hours. After the vacuum was released, tallowamine (14g of Kenamine P970) was added and the mixture was stirred for one hour. Trimethylolpropane triacrylate (19.7g) was then added. The mixture was stirred for a half hour and then discharged. The polyamide was poured onto release paper to cool.

Samples for tensile testing were prepared according to the method described in Example 1. These samples were then placed under a Dymax Light-Welder PC-2 with a UV-B filter at a distance of ten inches from the Light-Welder and allowed to cure for six minutes. The sample was then turned over and allowed another six minutes cure time for the other side. The samples were then tested according to ASTM D-638 as described in Example 1.

The results of the tensile tests performed on the cured samples and viscosity measurements for the uncured polyamide resin are found in Table 1.

EXAMPLE 9

Acrylate Modification of Polyamide B With Di(hydrogenated)tallowamine

Polyamide B of Example 5 (200g) was combined with Irgacure 907 (1g) and hydraquinone (0.4g). These ingredients were charged into a small resin kettle equipped with a nitrogen inlet, stirrer, and thermocouple. The solution was stirred upon heating to 160° C. A vacuum was applied for three hours. After the vacuum was released, di(hydrogenated)tallowamine (20g of Adogen 240) was added and the mixture was stirred for one hour. Trimethylolpropane triacrylate (16.1g) was then added. The mixture was stirred for a half hour and then discharged. The polyamide was poured onto release paper to cool.

Samples for tensile testing were prepared according to the method described in Example 1. These samples were then placed under a Dymax Light-Welder PC-2 with a UV-B filter at a distance of ten inches from the Light-Welder and allowed to cure for six minutes. The sample was then turned over and allowed another six minutes cure time for the other side. The samples were then tested according to ASTM D-638 as described in Example 1.

The results of the tensile tests performed on the cured samples and viscosity measurements for the uncured polyamide resin are found in Table 1.

TABLE 1

| | | 23° C. | | | | 60° C. | | | |
|---|---|---|---|---|---|---|---|---|---|
| Sample | Viscosity at 190° C. cps | Modulus psi | Break Stress psi | Break Strain % | Break Energy ft-lbs | Modulus psi | Break Stress psi | Break Strain % | Break Energy ft-lbs |
| 1 | 10,160 | 11,160 | 735 | 429 | 2.95 | 1,007 | 134 | 102 | 0.13 |
| 2 | 45,900 | 6,949 | 2,199 | 379 | 5.18 | 1,275 | 711 | 393 | 1.85 |
| 3 | 2,610 | 6,001 | 1,137 | 187 | 1.48 | 906 | 280 | 127 | 0.24 |
| 4 | 6,180 | 6,062 | 1,764 | 421 | 4.73 | 733 | 512 | 316 | 1.08 |
| 5 | 6,550 | 4,837 | 318 | 512 | 1.33 | 336 | 70 | 138 | 0.07 |
| 6 | 46,800 | 2,580 | 1,050 | 410 | 2.78 | 612 | 252 | 290 | 0.47 |
| 7 | 3,030 | 6,520 | 311 | 178 | 0.60 | 432 | 32 | 56 | 0.02 |
| 8 | 10,300 | 2,505 | 1,435 | 385 | 3.19 | 421 | 369 | 229 | 0.50 |
| 9 | 5,360 | 1,737 | 1,341 | 600 | 4.11 | 557 | 397 | 257 | 0.50 |

We claim:

1. An acrylate-modified aminoamide resin comprising the Michael addition product of a thermoplastic polyamide and an amine-containing reactive diluent with a polyol ester having a plurality of acrylate ester groups, wherein the mole ratio of the initial acrylate groups of the polyol ester to the initial amino groups of the polyamide and an amine-containing reactive diluent ranges from about 0.5 to about 8.0, and wherein the acrylate-modified aminoamide resin contains from about 1% to about 25% by weight polyamide of a 10 to 44 carbon atom mono- or di-substituted amine.

2. An acrylate-modified polyamide resin of claim 1 wherein said thermoplastic polyamide is derived from a polymerized unsaturated fatty acid and linear, branched and/or cyclic polyamines.

3. An acrylate-modified polyamide resin of claim 1 wherein said thermoplastic polyamide is derived from dimer acid and linear, branched and/or cyclic polyamines.

4. An acrylate-modified polyamide resin of claim 1 wherein said thermoplastic polyamide is derived from a polymerized unsaturated fatty acid, a linear dicarboxylic acid, piperazine, and a linear or branched short chain diamine.

5. A polyamide resin of claim 1 wherein said thermoplastic polyamide is an amino-terminated aminoamide derived from the dicarboxylic acid fraction of dimer acid, a linear diacid, piperazine, and ethylenediamine.

6. An acrylate-modified polyamide resin of claim 1 wherein, said thermoplastic polyamide comprises dimer acid, linear diacid, piperazine, short chain diamines, and polyether diamine.

7. An acrylate-modified polyamide resin of claim 1 wherein said thermoplastic polyamide is derived from dimer acid, linear diacid, and short chain diamines.

8. An acrylate-modified polyamide resin of claim 1 wherein said thermoplastic polyamide is derived from dimer acid, linear diacid, dimer diamine, short chain diamines, and polyether diamine.

9. An acrylate-modified polyamide resin of claim 1 wherein said thermoplastic polyamide has an amine number of between 1 and 50.

10. An acrylate-modified polyamide resin of claim 1 wherein said thermoplastic polyamide has an amine number of between about 2 and about 20.

11. An acrylate-modified polyamide resin of claim 1 wherein said polyol ester is a polyol triacrylate selected from the group consisting of trimethylolpropane triacrylate, trimethylolethane triacrylate, ethoxylated trimethylolpropane triacrylate, and trimethylolpropane trimethacrylate.

12. An acrylate-modified polyamide resin of claim 1 wherein said polyol ester is selected from the group consisting of pentaerythritol tri- or tetraacrylate and pentaerythritol tri- or tetramethacrylate.

13. An acrylate-modified polyamide resin as defined in claim 1 wherein said thermoplastic polyamide is derived from a polymerized unsaturated fatty acid, a linear aliphatic dicarboxylic acid, piperazine, and a linear short chain diamine, and has an amine number between about 3 and about 20, and wherein said polyol ester is trimethylolpropane triacrylate.

14. An acrylate-modified polyamide resin as defined in claim 13 further comprising a free radical thermally curing initiator having a half-life of at least about 10 hours at a temperature of about 50° C.

15. An acrylate-modified polyamide resin of claim 14 wherein said free radical and curing initiator is dicumyl peroxide.

16. The composition of claim 1 wherein the weight ratio of polyamide resin to reactive diluent is from about 100 to 1 to about 100 to 25.

17. The composition of claim 16 wherein the weight ratio of polyamide resin to reactive diluent is from about 100 to 3 to about 100 to 20.

18. The composition of claim 1 wherein said reactive diluent comprises a low volatility secondary amine.

19. The composition of claim 1 wherein said reactive diluent compromises a low volatility primary amine.

20. The composition of claim 1 wherein the reactive diluent is selected from the group consisting of stearylamine, tallowamine, ditallowamine, dihydrogenated tallowamine, tallowaminopropylamine, and dimer diamine.

21. A method of manufacturing an acrylate-modified polyamide resin which comprises admixing a thermoplastic polyamide and an amine-containing reactive diluent with a polyol ester having a multiplicity of acrylate ester groups, the initial ratio of the acrylate groups of the polyol ester to the total amino groups of the aminoamide polymer and amine-containing diluent being greater than 0.5 to less than about 8.0, and heating until the Michael addition reaction is substantially completed, and adding an effective amount of an initiator for thermal curing.

22. A method of manufacturing an acrylate-modified polyamide resin which comprises admixing a thermoplastic polyamide and an amine containing reactive diluent with a polyol ester having a multiplicity of acrylate ester groups, the initial ratio of the acrylate groups of the polyol ester to the total amino-hydrogen functional groups of the polyamide and amine-containing reactive diluent being greater than 0.5 to about 8.0, and heating until the Michael addition reaction is substantially completed.

* * * * *